(12) United States Patent  
Sampson et al.

(10) Patent No.: US 7,401,574 B1
(45) Date of Patent: Jul. 22, 2008

(54) BAIT CUTTING TABLE FOR ADJUSTABLE DRINK HOLDER

(76) Inventors: Eric M. Sampson, 409 Manor View La., Deland, FL (US) 32724; Paul D. Sampson, 3061 Malcom Dr., Deltona, FL (US) 32738

( * ) Notice: Subject to any disclaimer, the term of this patent is extended or adjusted under 35 U.S.C. 154(b) by 0 days.

(21) Appl. No.: 11/711,918

(22) Filed: Feb. 28, 2007

Related U.S. Application Data

(63) Continuation of application No. 11/380,204, filed on Apr. 25, 2006, now abandoned.

(51) Int. Cl.
*A01K 1/10* (2006.01)
(52) U.S. Cl. .................................... 119/51.01
(58) Field of Classification Search ............... None
See application file for complete search history.

(56) References Cited

U.S. PATENT DOCUMENTS

| | | | |
|---|---|---|---|
| 4,062,299 A | 12/1977 | Smith | |
| 4,500,059 A * | 2/1985 | Papizan | 248/205.1 |
| 4,524,701 A * | 6/1985 | Chappell | 108/44 |
| 4,685,242 A | 8/1987 | Stanish | |
| 4,790,097 A | 12/1988 | Blackiston | |
| D308,792 S | 6/1990 | Lord et al. | |
| 4,959,921 A | 10/1990 | Stanish et al. | |
| D326,211 S | 5/1992 | Allen | |
| D352,427 S | 11/1994 | Burd | |
| D366,400 S | 1/1996 | Dentsbier | |
| 5,609,521 A | 3/1997 | Allred et al. | |
| 5,628,681 A | 5/1997 | White et al. | |
| 5,971,139 A | 10/1999 | Bradley | |
| 6,726,050 B1 | 4/2004 | Barentine et al. | |
| 6,883,692 B2 * | 4/2005 | Harden et al. | 224/275 |
| 7,004,102 B2 | 2/2006 | Sampson et al. | |
| 7,147,192 B2 * | 12/2006 | Kong | 248/311.2 |
| 7,243,991 B2 * | 7/2007 | Ojeda | 297/188.14 |
| 2002/0185578 A1 * | 12/2002 | Hudson | 248/311.2 |
| 2005/0051584 A1 * | 3/2005 | Shelmon et al. | 224/275 |

* cited by examiner

*Primary Examiner*—Thomas Price
(74) *Attorney, Agent, or Firm*—Patent & Trademark Services, Inc; Joseph H. McGlynn

(57) ABSTRACT

A table that is temporarily mounted to an adjustable drink or rod holder. The table has a projection that fits into the drink or rod holder and rotatable locks to secure the table in place.

13 Claims, 2 Drawing Sheets

US 7,401,574 B1

BAIT CUTTING TABLE FOR ADJUSTABLE DRINK HOLDER

This application is a Continuation of Ser. No. 11/380,204 filed Apr. 25, 2006 now abandoned.

BACKGROUND OF THE INVENTION

This invention relates, in general, to fishing accessories, and, in particular, to a cutting table for attachment to a drink or rod holder.

DESCRIPTION OF THE PRIOR ART

In the prior art various types of fishing devices have been proposed. For example, U.S. Pat. No. 5,971,139 to Bradley discloses a food tray and beverage holder which can be held with one hand.

U.S. Pat. No. 6,726,050 to Barentine et al discloses a cutting board that mounts to an ice chest.

U.S. Pat. No. 5,628,681 to White et al discloses a fish cleaning board that mounts on a cooler or a flat surface.

U.S. Pat. No. 5,609,521 to Allred et al discloses a cutting board that mounts to a cleat.

U.S. Pat. No. D366,400 to Dentsbier discloses an ornamental design for a fish and bait cutting board having either clamps or suction cups to mount to a boat.

U.S. Pat. No. D308,792 to Lord et al discloses an ornamental design for a fish cleaning board to be placed on a flat surface.

U.S. Pat. No. 4,959,921 to Stanish et al discloses a device for cutting large pieces of bait into smaller ones while being towed through the water.

U.S. Pat. No. 4,062,299 to Smith discloses a demountable bait cutting table that fits onto a rod designed to fit into a rod holder.

U.S. Pat. No. D352,427 to Burd discloses an ornamental design for a fish cleaning board.

U.S. Pat. No. D326,211 to Allen discloses an ornamental design for a fish cleaning board.

U.S. Pat. No. 4,685,242 to Stanish discloses a device for cutting large pieces of bait into smaller ones while immersed in water.

U.S. Pat. No. 4,790,097 to Blackiston discloses a portable bait cutting device.

U.S. Pat. No. 7,004,102 to Sampson et al discloses an adjustable drink holder for fishing boats.

Many fishing boats do not come equipped with a bait cutting table, however almost all fishing boats have rod holders or cup holders. Therefore, a device which can be configured as a bait cutting table and that can be mounted to an existing rod or drink holder temporarily would be advantageous to all boat owners.

SUMMARY OF THE INVENTION

The present invention is directed to a table that is temporarily mounted to an adjustable drink or rod holder. The table has a projection that fits into a drink or rod holder and rotatable locks to secure the table in place.

It is an object of the present invention to provide a new and improved accessory for a boat.

It is an object of the present invention to provide a new and improved accessory for a boat that can be used with existing accessories.

It is an object of the present invention to provide a new and improved accessory for a boat that can be secure in place.

These and other objects and advantages of the present invention will be fully apparent from the following description, when taken in connection with the annexed drawings.

DESCRIPTION OF THE PREFERRED EMBODIMENT

Figures 1, 2:
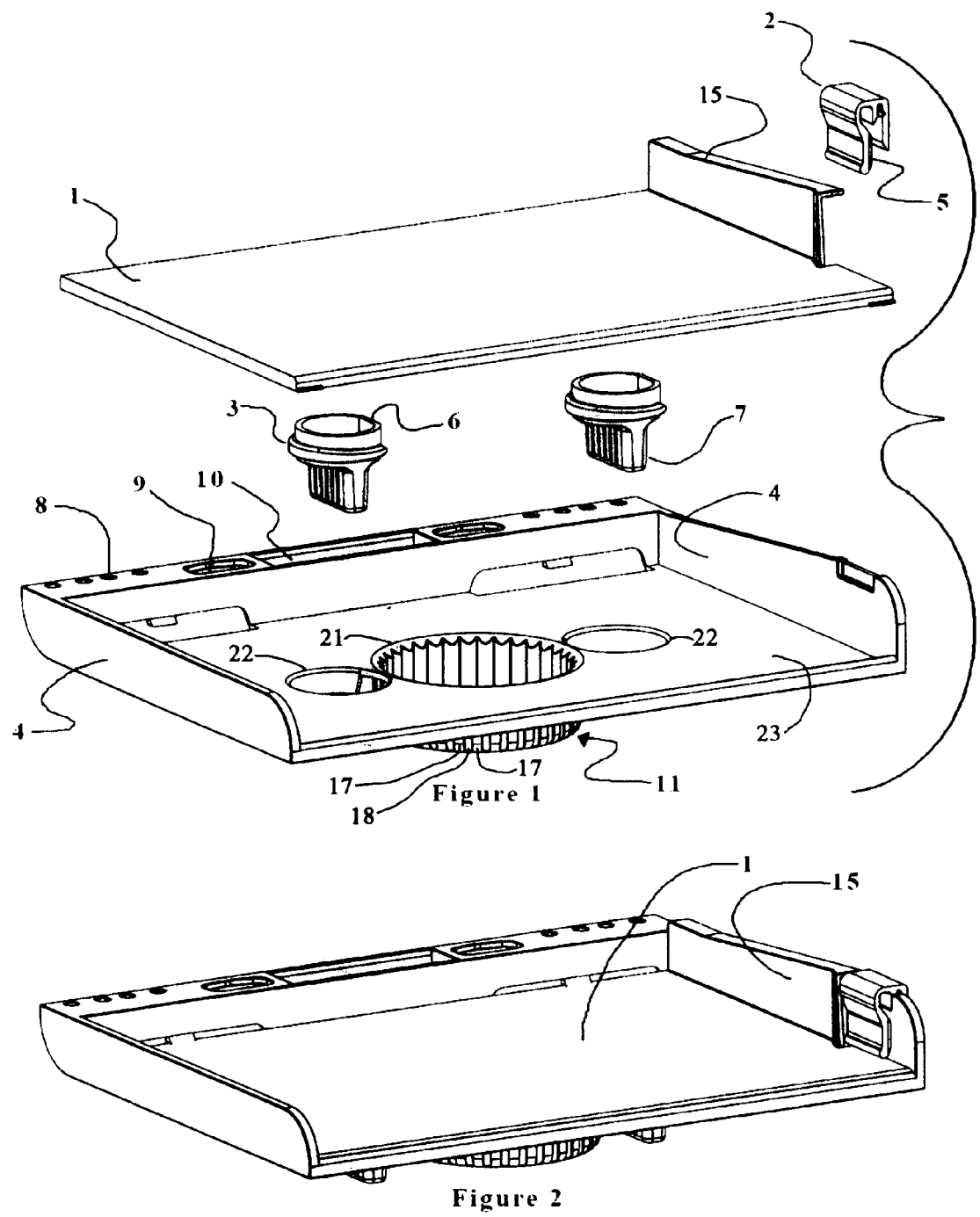
FIG. 1 is an exploded view of the present invention.
FIG. 2 is a perspective assembled view of the present invention.

Referring now to the drawings in greater detail, FIG. 1 shows an exploded view of the present invention. It has a flat upper surface 1 with a cover 16 secured to one side. A substantially U-shaped clip 2 having a leg 5 will be used to hold a knife or other cutting instrument. The upper surface is secured to a lower surface 23, seen below the upper surface 1 in FIG. 1. The lower surface has a pair of side surfaces or side walls 4 and a back surface. The back surface has a plurality of apertures 8, 9, which can be used to hold a variety of items. Apertures 8 are circular, apertures 9 are oval, and aperture 10 is rectangular, however, other shapes can be used without departing from the scope of the invention. The upper surface fits onto the lower surface between the side walls 4 and the back wall, and can be secured using any conventional means.

The bottom surface has a large central aperture 21 and two smaller apertures 22 on opposite sides of the central aperture. The central aperture 21 holds a cup-like projection with a plurality of ribs 17 spaced around the outer periphery of the projection. The area between each pair of ribs creates valleys or grooves 18, for a purpose to be explained latter. The smaller apertures hold knobs or twist locks 3. Each twist lock 3 is substantially circular and has a handle 7 by which the lock can be grasped and turned. Each lock also has a flat surface 6. The distance between the center of the lock and the flat surface 6 is less than the distance from the center of the lock and the portion opposite from the flat surface 6.

The cover 15 fits over one of the sides 4 when the upper and lower surfaces are put together, as shown in FIG. 2. The area between the cover and the inner surface of the side 4 forms a sheath for a knife. The clip 2 fits over the side 4 to help secure the knife.

Figure 3:
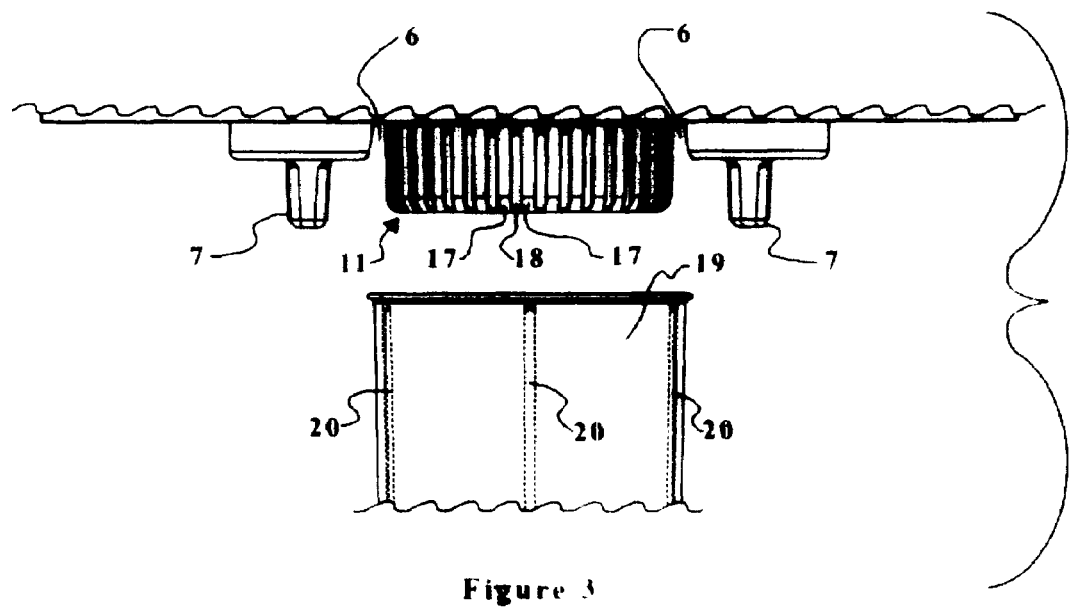
FIG. 3 is an exploded view of the present invention just before it is joined with a cup holder.
Figure 4:
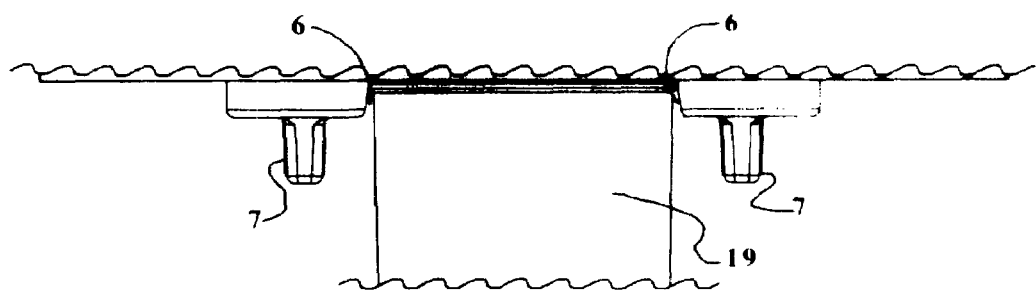
FIG. 4 is a view of the present invention just after it is joined with a cup holder.

In order to use the present invention it is placed over a cup holder 19 as shown in FIG. 3. The cup holder 19 can be a cup holder such as disclosed in U.S. Pat. No. 7,004,102 to Sampson et al, or any other conventional cup holder. The holder 19 has a plurality of longitudinal extending lands or ribs 20 which extend along the inside of the cup holder. The ribs are the same dimension as the areas 18 between the ribs 17 on the outside periphery of the projection 11. Both locks 3 should first be turned so the flat side 6 is closest to the projection 11. This is the first position of the locks and is shown by the lock on the right side of FIG. 4.

Once the invention is in position, it is lowered onto the cup holder 19 until the projection 11 fits into the cup holder 19. Now, the user grabs the handle 7 on one of the locks and rotates it a half turn so the flat side 6 is furthest from the projection 11. This is the second position of the lock and is the position shown by the lock on the left side of FIG. 4. The second lock is then turned so the flat side 6 on the second lock is furthest from the projection 11. Since the distance between the flat side 6 and the projection 11 is smaller in position one than it is in position two, when the locks are turned from the first position (the flat side 6 is closest to the projection 11) to the second position (the flat side 6 is furthest from the projection 11) the locks will engage the outside surface of the cup holder 19. This will prevent the lands 20 from becoming disengaged from the grooves 18. If the lands 20 can not be disengaged from the grooves 18 the projection 11 and the upper surface 1 and lower surface 23, which are attached to the projection 11, will not be able to rotate with respect to the cup holder 19.

This will provide a convenient surface to be used by boaters for cutting fish or bait. Since it is detachable it can be brought out only when needed and put away when it is not needed.

Although the BAIT CUTTING TABLE FOR ADJUSTABLE DRINK HOLDER and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

We claim:

1. A detachable table for being secured to a holder, wherein said detachable table comprises:
   an upper surface and a lower surface,
   said upper surface having a top and a bottom, and
   said lower surface having a top and a bottom, and
   means for securing said upper surface to said lower surface,
   means on said bottom of said lower surface for engaging said holder, and
   means on said bottom of said lower surface for securing said holder to said means on said bottom of said lower surface for engaging said holder, and
   wherein said means on said bottom of said lower surface for engaging said holder is a projection which extend away from said bottom of said lower surface, and
   wherein said projection is circular.

2. The detachable table as claimed in claim 1, wherein said projection has means for preventing said projection from rotating with respect to said holder.

3. The detachable table as claimed in claim 2, wherein said means for preventing said projection from rotating is a plurality of ribs on an external surface of said projection.

4. The detachable table as claimed in claim 1, wherein said top of said upper surface has a cover, and
   said top of said lower surface has at least one side wall,
   said cover is in close proximity to said at least one side wall when said upper surface and said lower surface are secured, and
   a clip secured to said at least one side wall adjacent said cover.

5. A detachable table for being secured to a holder, wherein said detachable table comprises:
   an upper surface and a lower surface,
   said upper surface having a top and a bottom, and
   said lower surface having a top and a bottom, and
   means for securing said upper surface to said lower surface,
   means on said bottom of said lower surface for engaging said holder, and
   means on said bottom of said lower surface for securing said holder to said means on said bottom of said lower surface for engaging said holder, and
   wherein said means on said bottom of said lower surface for securing said holder to said means on said bottom of said lower surface for engaging said holder comprises a pair of knobs.

6. The detachable table as claimed in claim 5, wherein each of said knobs has a circular portion and a handle portion.

7. The detachable table as claimed in claim 6, wherein said circular portion has a flat portion on a periphery thereof.

8. The detachable table as claimed in claim 7, wherein said knobs are rotated from a first position to a second position, and
   when said knobs are in said first position said flat portion is a first distance from an external surface of said projection, and
   when said knobs are in said second position said flat portion is a second distance from said external surface of said projection, and
   wherein said second distance is greater than said first distance.

9. A detachable table for being secured to a holder, wherein said detachable table comprises:
   an upper surface and a lower surface,
   said upper surface having a top and a bottom, and
   said lower surface having a top and a bottom, and
   means for securing said upper surface to said lower surface,
   a projection extending away from said bottom of said lower surface, and
   said projection has ribs extending along an external surface of said projection, and
   means on said bottom of said lower surface for securing said holder to said projection, and
   wherein said means on said bottom of said lower surface for securing said holder to said projection comprises a pair of knobs.

10. The detachable table as claimed in claim 9, wherein each of said knobs has a circular portion and a handle portion.

11. The detachable table as claimed in claim 10, wherein said circular portion has a flat portion on a periphery thereof.

12. The detachable table as claimed in claim 11, wherein said knobs are rotated from a first position to a second position, and
    when said knobs are in said first position said flat portion is a first distance from an external surface of said projection, and
    when said knobs are in said second position said flat portion is a second distance from said external surface of said projection, and
    wherein said second distance is greater than said first distance.

13. The detachable table as claimed in claim 9, wherein said top of said upper surface has a cover, and
    said top of said lower surface has at least one side wall,
    said cover is in close proximity to said at least one side wall when said upper surface and said lower surface are secured, and
    a clip secured to said at least one side wall adjacent said cover.

* * * * *